United States Patent Office 3,740,219
Patented June 19, 1973

3,740,219
PHOTOCONDUCTIVE ISOCYANATE REACTION PRODUCTS AND DEPOSITED LAYERS
Horst Heinz-Joachim Kosche, Duren, Germany, assignor to Renker G.m.b.H., Duren, Germany
No Drawing. Continuation-in-part of abandoned application Ser. No. 612,826, Jan. 13, 1967. This application Oct. 26, 1970, Ser. No. 84,185
Int. Cl. G03g 5/06, 5/08
U.S. Cl. 96—1.8                                5 Claims

ABSTRACT OF THE DISCLOSURE

Photoconductive sensitized and unsensitized layers for use with electro-photographic recording materials, are formed by the photoconductive reaction products of at least one aromatic or heterocyclic organic nitrogen compound which is substantially nonphotoconductive with at least one organic compound containing at least one isocyanate group, to provide a self-adhering photoconductor which may additionally include a known photoconductive material.

This application is a continuation-in-part of application Ser. No. 612,826, filed Jan. 13, 1967, now abandoned.

BACKGROUND OF THE INVENTION

The invention relates to photoconductive sensitized and unsensitized layers for electrophotographic recording materials and to photoconductive reaction products for use therein.

Known photoconductive layers usually consist of selenium or of a diversity of mixtures of photoconductive substances and binders which have the properties of insulating materials. For example, photoconductors which have the character of pigments may be finely dispersed in the binders. In combination with the binders, organic photoconductors are also used in the form of components of a solid solution. Among the many insulating binders that have been employed, reaction products of isocyanates with organic compounds containing hydroxyl groups are already known in the art.

In photoconductive layers which are thus formed from dispersions of pigment-like photoconductors and insulating binders, it is only the particles of the photoconductor in the layer that are capable of forming the image, i.e. of retaining the particles of the toner. The electro-photographich image therefore necessarily has a more or less discontinuous, grainy texture which is the more pronounced the coarser the particles of the dispersed photoconductor. This fact results in an unsatisfactory rendering of the half tones and of the color tones.

Soluble organic photoconductors which are combined with a binder as constituents of a solid solution tend to crystallize and form granular agglomerates or precipitates. The electro-photographic image then likewise has a grainy appearance. Since a layer formed from such solid solutions therefore becomes impoverished in photoconductive material in patches, the maintenance required for a longer period of a uniform concentration of active substance in the layer is difficult to achieve. Finally, not every suitable photoconductor in association with any suitable binder is capable of forming a solid solution. Again, when such an affinity for forming a solid solution exists, a liquid solvent which will dissolve both components at the same time is often lacking.

It is therefore the object of the present invention to provide photoconductive substances which combine film-forming properties with adhesive power, and which are thus particularly suitable for the preparation of electro-photographic materials.

GENERAL DESCRIPTION OF THE INVENTION

The proposed substances are obtained by reacting at least one aromatic or heterocyclic organic nitrogen compound, which is not photoconductive or which is only insufficiently photoconductive, with at least one organic compound containing at least one isocyanate group, to form a reaction product which is photoconductive, possesses adhesive power and/or which is capable of forming a film and which may or may not be sensitized. The reaction products obtained according to the present invention will hereinafter be referred to as "self-adhering photoconductors."

Accordingly another object of the invention is the preparation of combinations having specific effects of the novel electro-photographically active and simultaneously film-forming and adhesive reaction products with the pigment-like photoconductors that are already known in the art. The combination of the self-adhering photoconductors of the invention with the pigment-like photoconductors leads to the formation of layers composed exclusively of photoconductors.

It could not have been predicted that novel electro-photographically effective products could be obtained by reacting compounds containing isocyanate groups with compounds selected as proposed by the present invention. That the above-described reaction products of the invention would be electro-photographically effective, that is, that they would possess the property of photoconductivity derives from the novel choice of reactants and represents a completely unexpected result, since products of analogous structure have in the past been known to be suitable only as insulating binders for known photoconducting components. In the practical production of electro-photographic materials such prior art binders are functionally clearly distinguished from the actual photoconducting substance.

A typical prior art binder composition is that disclosed in Bunge et al. Patent 3,025,160, which discloses a resinous insulating binder, itself nonphotoconductive, in which a known photoconductive substance is incorporated, to form a photoconductive insulating layer. The binder is formed by reacting with an isocyanate a resinous reactant which contains a plurality of hydroxyl groups such as certain polyesters, epoxides, and condensation products of polyhydroxy compounds with aldehydes, which resinous reactants are not organic nitrogen compounds. The resulting binders require the inclusion of separate photoconductive materials such as zinc oxide to transform them into photoconductive layers. In contrast thereto, the self-adhering photoconductors of the present invention are active photoconductor layers per se, or in cases where an extra known photoconductive substance is incorporated therein, there results a mixture of two independently active photoconductors, leading to enhanced performance.

Hereinafter the compounds that will react with isocyanates are briefly referred to as reaction component (A), whereas compounds containing the isocyanate groups are referred to as reaction component (B).

Suitable reaction components (A) which contain nitrogen and which are, as previously mentioned, aromatic or heterocyclic organic compounds, are themselves substantially nonphotoconductive. They may be characterized generally as being derived from primary substances hereinafter referred to as Z, which are mono- or polynuclear aromatic or heterocyclic ring systems. Examples of such aromatic ring systems include benzene, naphthalene, and diphenyl, while examples of heterocyclic ring systems include pyridine, qunoline, benzothiazole, phthalimide, carbazole, hydantoin, imidazole, triazole, triazine, pyrimidine, purine, and the like. These lists of examples are, however, to be regarded as illustrative, and not as limited to the specific systems named.

Reaction component (A) accordingly comprises such a primary substance Z having substituted therein at least one functional substituent group X capable of reacting with an isocyanate group. Where several substituents X are present, they may be like or unlike. The primary substances Z may also contain one or more like or unlike substituents Y. Y represents one or more groups which are effective as electron donors or acceptors and/or which permit the creation of hydrogen bridges and/or which are capable of inducing electron displacements in the primary substance Z or in the photoconductor that is formed, for instance to bring about mesomeric states. If the primary substance Z does not itself contain nitrogen, then at least one of the substituents X or Y must contain nitrogen. Thus, the reaction component (A) is preferably one containing one or more nitrogen atoms, such as an amine, amide, nitro or nitroso derivative, or a nitrile, such compounds being substantially nonphotoconductive but being capable of reacting with the isocyanate component (B). Numerous examples of substituent groups which impart these properties are given below.

At least one substituent X must be directly attached to the primary substance Z if the latter does not contain a further substituent Y. If one or more substituents Y are attached to the primary substance Z, then substituents X may be attached to one of the substituents Y or form a constituent part thereof, or it may be attached to the primary substance Z or included in substituent Y by being attached to a non-polarizable or only slightly polarizable group, such as a lower molecular weight alkyl radical which may contain further substituents. It is therefore a necessary condition that the primary substance Z should contain at least one substituent Y or in the formed photoconductor at least one substituent X modified by having reacted with organic isocyanates in such a way that the primary substance Z and the photoconductor that forms, possibly with the inclusion of substituents bound to the primary substance Z can change into the mesomeric i.e. polarised form or be rendered capable of transferring electrons.

Preferably interaction of the group formed by substituent X and at least one isocyanate group with substituent Y to provide the possibility of charge mobility should be the aim. The relative positions should therefore be so chosen that peak centres of charge are formed or that the development of base or acid structures in the form of donor and acceptor complexes is favoured, or that the inner or intermediate molecular formation of hydrogen bridges is possible. The substituent Y which functions as electron donor or acceptor may be simultaneously formed directly from substituent X by reaction with isocyanates.

If the preparation of a self-adhering photoconductor is based upon the use of a reaction component (A) containing several substituents X, then at least one substituent X must be reacted with an organic isocyanate to modify the same and to enlarge the molecule, whereas the others may remain unchanged. Moreover, the substituent X particularly hydrogen, may be a constituent member of a heterocyclic system.

Particularly appropriate groups X which are reactive with isocyanates include: Active H, e.g.

—OH, —SH, —NH$_2$, —NH, —NHR, —NH—acyl, —COOH,

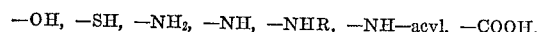

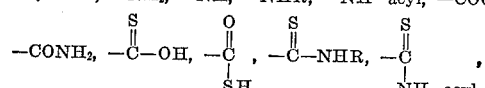

—NRNH$_2$, —NR—NHR, —NH—NHR, =N—NH$_2$, =N—NHR, —NH—CO—NH$_2$, —N—C—NH$_2$, —NR—CO—NHR,
                               H S

—NR—C—NHR, —NH—C—NH$_2$, —NH—C—NHR
     ||            ||           ||
     S            NH         NH biguanidine, biuret, —SO$_3$H, —SO$_2$NH$_2$, —SO$_2$NHR, —SO$_2$NH—acyl, —SO—NHR, activated methylene groups; =O$_1$, =S$_1$, —NO.

Suitable as substituent Y are: —H, —alkyl, —halogen, —acyl, —NR$_2$, =NR, —NHR, —OH, =O, —OR, —COOH, —COOR, —CONR$_2$, —NR—acyl, —NO$_2$, =S, —SO$_2$—, —SO$_2$Cl, —SO$_2$NR$_2$, —SO—, —SR—, —CN, —CNS, —NCO, —O—acyl, —NR—CO—NH$_2$, —NR—CS—NH$_2$, —NR—CS—NR$_2$,

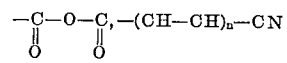

where R stands for an aliphatic radical containing 1 to 12 C-atoms or a phenyl radical either of which may contain one or more —NO$_2$, dialkylamino, halogen or —CH groups or a substituent X, particularly —OH, —NH$_2$, —NH—alkyl,

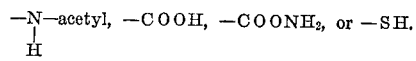

—COOH, —COONH$_2$, or —SH.

Acyl means an aliphatic or aromatic monocarboxylic acid, or polycarboxylic acid which may contain one or more nitro, dialkyl, amino, halogen, hydroxy or keto groups, such as benzoic acid, 3,5-dinitrobenzoic acid, p-dialkylaminobenzoic acid, lactic acid, formic acid, acetic acid or tartaric acid, acetoacetic acid or oxaloacetic acid, malonic acid, succinic acid, adipic acid or terephthalic acid; $n$ is 1, 2 or 3.

In polycarboxylic acids only one carboxyl group need belong to the substituent X or Y in a system Z. Moreover, like or different systems Z may be linked at substituent X or Y by polycarboxylic acids. Alternatively, one of the free carboxyl groups of polycarboxylic acids may be attached to X or Y of system Z and the others modified to the ester of dialkylamide group.

The substituent K which is preferably attached to a lower molecular weight aliphatic radical between system Z and the substituent X may be halogen, —R', —CN, OR', —NR'$_2$, —COOR', —O—acyl, —CO—NR'$_2$, or —SR', where R' is an aliphatic radical containing 1 to 6 C-atoms.

A number of structural formulae using the above defined symbols are hereunder given to illustrate the above definition of reaction component (A):

(1) p-Nitro-anilne

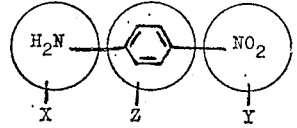

(2) N-ethyl-N-(β-hydroxyethyl)-aniline

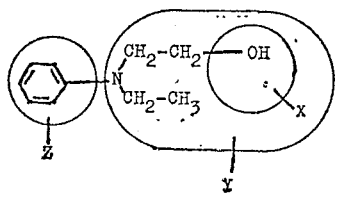

—CONH$_2$, —C—OH, —C , —C—NHR, —C
         ||          ||         ||                 ||
         S         O        S                S
                                    SH                    NH—acyl

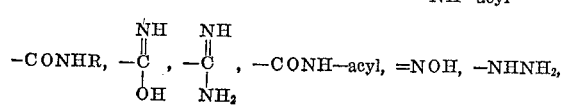

(3) N-(γ-Chloro-β-hydroxy-n-propyl)-N-ethyl-aniline

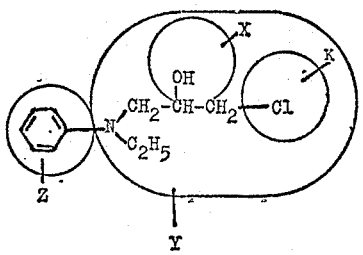

(4) N,N'-bis-(3-nitrophenyl)-oxamide

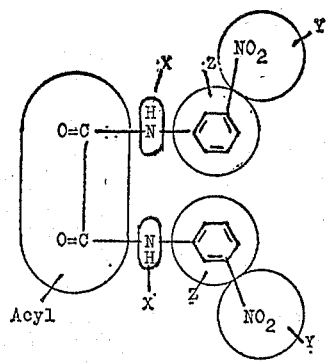

(5) Diphenylamine

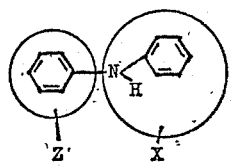

(6) N-(β-hydroxyethyl)-diphenylamine

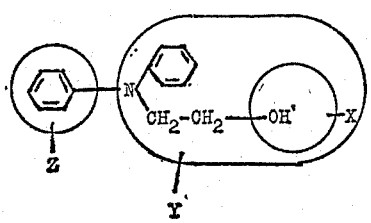

(7) p-Dimethylamino-acetoacetic anilide

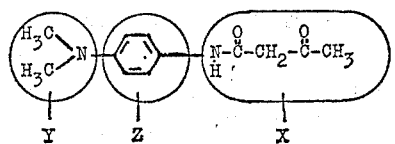

(8) N,N'-bis-(4-dimethylaminophenyl)-p - phenylene diamine

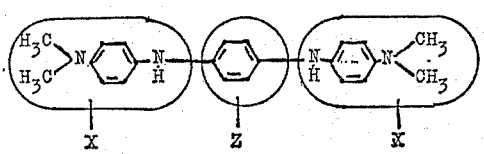

(9) 4-(3-nitrobenzoyl)-amino-diphenyl

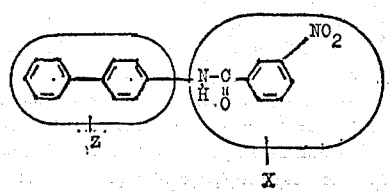

(10) 4-diethylamino-benzalmalonic mononitrile

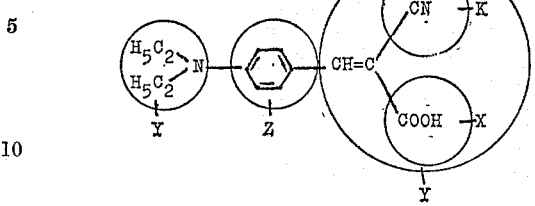

Compounds suitable for use as reaction component A include the following:

m-Nitroaniline
p-Nitroaniline
o-Nitroaniline
o-, m- or p-Nitro-N-ethyl-N(β-hydroxyethyl)-aniline
3,5-dinitroaniline
2-methyl-4-nitro-5-chloro-aniline
m-Nitro-N-acetyl-aniline
m-Nitro-N-methyl-aniline
2-hydroxy-propylene-di(-4-nitro-methylaniline)
p-Nitro-N-benzoyl-aniline
4-(N-ethyl-N-hydroxyethyl)-amino-phenyl cyanide
m-Nitro-N-(4-dimethylaminobenzoyl)-aniline
p-Nitro-N-(4-nitrobenzoyl)-aniline
p-Dimethylamino-acetoacetanilide
m-, o-, or p-Mononitroacetoacetanilide
Nitrophenyl cyanamide
Acetoacetanilide
p-Chloro-acetoacetanilide
N,N'-bis-(3-nitrophenyl) oxamide
N,N'-bis-(4-dimethylaminophenyl) oxamide
2,5-dimethoxy-4-chloro-aniline
2-nitro-4-chloro-aniline
2,5-diethoxy-4-nitro-aniline
N-ethyl-N-β-hydroxyethyl-aniline
(N-chloro-β-oxypropyl)-ethylaniline
1-(3'-aminophenyl)-ethanol, sec.
Phenylene dimanie (o, m or p)
N,N-diethyl-p-phenylenediamine
N,N-diethyl-N'-methyl-p-phenylenediamine
N,N-diethyl-N'-methyl-N'-(β-hydroxyethyl)-p-phenylenediamine
N,N-diethyl-N'-acetyl-p-phenylenediamine
N,N-diethyl-N'-benzoyl-p-phenylenediamine
N,N-dimethyl-N'-(4-nitrobenzoyl)-p-phenylenediamine
N,N'-(2-hydroxypropylene)bis-diphenylamine
N,N-diethyl-N'-(4-dimethylaminobenzoyl)-p-phenylenediamine
N-diethyl-N'-acetyl-2-methyl-p-phenylenediamine
N,N-diethyl-N'-acetoethyl-p-phenylenediamine
N,N-diethyl-N'-(2,4-dichlorobenzoyl)-p-phenylenediamine
N,N'-di-(2-naphthyl)-p-phenylenediamine
N,N'-diphenyl-p-phenylenediamine
N',N'-dimethyl-m-phenyldiamine
N,N'-bis-(4-dimethylaminophenyl)-p-phenylenediamine
2-hydroxypropylene-di-(N-methyl-N'-diethylamino-p-phenylenediamine)
p-Phenylenediamine
Diphenylamine
N-(β-hydroxyethyl)-diphenylamine
N-(β-hydroxy-β-chloropropyl)-diphenylamine
4,4'-bis-diethylamino-diphenylamine
3-nitro-diphenylamine
3,3'-diethoxy-diphenylamine
4-nitro-4'-diethylamino-diphenylamine
4-methoxyphenyl-4'-methylaminophenyl-naphthylmethylamine
4-hydroxy-4'-diethylamino-diphenylamine
Benzidine
N,N-diethyl-N'-ethyl-N'-(β-hydroxyethyl)-benzidine N,N-diethyl-N'-benzoyl-benzidine
N,N-dimethyl-N'-methyl-benzidine
N,N'-dibenzoyl-benzidine
N,N'-di-(3-dimethylaminobenzoyl)-benzidine
4-acetamino-diphenyl
4-benzoylamino-diphenyl
4-(o-nitrobenzoyl)-amino-diphenyl
4-(p-dimethylaminobenzoyl)-amino-diphenyl
3,5-4'-trichloro-4-acetamino-diphenyl
4'-bromo-4-amino-diphenyl
4'-bromo-2-nitro-4-amino-diphenyl
4'-nitro-3-amino-diphenyl
4'-nitro-3-N-methyl-N-($\beta$-hydroxyethyl)-amino-diphenyl
4'-nitro-3-(p-dimethylamino-benzoyl)-amino-diphenyl
3,4'-dinitro-4-amino-diphenyl
2,2'-diamino-4'-methyl-diphenyl-4-carboxylic acid
2,2'-bis-diethylamino-4'-methyl-diphenyl-4-carboxylic acid
4'-dimethylamino-diphenyl-2-carboxylic acid
4'-(p-nitrobenzoyl)-amino-diphenyl-2-carboxylic acid
4'-N(p-dimethylaminobenzoyl)-N-methylamino-2-carboxylic acid
4,4'-bis-diethylamino-diphenyl-3-carboxylic acid
4-diethylamino-diphenyl-2-carboxylic acid
4-methylamino-diphenyl-2,2'-dicarboxylic acid
2,2'-di-acetamino-diphenyl-4,4'-dicarboxylic acid
4-diethylamino-diphenyl-4'-carboxylic acid
4-nitro-2'-diethylamino-diphenyl-4'-carboxylic acid
o, m or p-nitrophenol
2,4-dinitrophenol
Trinitrophenol
3-diethylamino-phenol
$\alpha$-Nitroso-$\beta$-naphthol
3,5-bis-(diethylamino)-phenol
1-phenoxy-2-amino-4-chlorobenzene
4'-dibutylamino-4-hydroxy-diphenyl
4'-diethylamino-4-hydroxy-diphenyl
4'-(o-nitrobenzoyl)-amino-4-hydroxydiphenyl
4-hydroxynaphthonitrile
p-Diethylaminobenzoic acid
m-Nitrobenzoic acid
p-Nitrobenzamide
p-Nitrobenzoic cyanamide
p-Aminobenzoic acid
m-Aminobenzoic acid
o-Aminobenzoic acid
m-Dimethylaminobenzoic acid
m-Dimethylaminobenzoic ethylamide
o-Dimethylaminobenzoic acid
Diethylamino-anilino-benzene-3,5-dicarboxylic acid
p-Nitrocinnamic acid
p-Nitro-$\beta$-cyanocinnamic acid
4-diethylamino-benzalmalonomononitrile
4-diethylamino-benzalmalonamide nitrile
4-nitro-benzalmalonomononitrile
2,4-dimethoxybenzylmalonomononitrile
4-hydroxy-benzalmalonodinitrile
p-Toluenesulphono-N-methylamide
4-nitro-diphenyl-4'-sulphonamide
4-diethylamino-diphenyl-4'-sulphonamide
4-acetylamino-diphenyl-4-sulphono-N-methylamide
Toluene-4-N-ethyl-sulphonamide
Toluene-4-N-propyl-sulphonamide
Toluene-4-N-butyl-sulphonamide
4-acetylamino-benzenesulphonamide
4-diethylamino-benzenesulphonamide
4-diethylamino-benzenesulphono-N-methylamide
$\alpha$-Naphthol-3-sulphonamide
p-Tolylbiguanidine
4,4'-bis-(diethylamino)-diphenylurea (symm.)
Carbazole
2-hydroxy-carbazole-3-carboxylic diethylamide
2-nitro-carbazole
5,5-dimethylhydantoin
Nitroindene
2,2'-dipiridylamine
Pyridine-3-carboxylic acid
Pyridine-3-carboxylamide
Maleic hydrazide
$\beta$-Hydroxyquinoline
5,7-dibromo-8-hydroxyquinoline
Phthalimide
N-$\beta$-hydroxyethylphthalimide
3-dimethylaminophthalimide
3-nitrophthalimide
3-diethylamino-N-(-hydroxyethyl)-phthalimide
Barbituric acid.

Suitable reaction components (B) are more particularly aromatic or heterocyclic monoisocyanates or polyisocyanates or the dimerised products of isocyanates known as uret-diones which may also contain isocyanate groups that are not dimerised. Reaction component (B) may also be an aromatic or heterocyclic system which contains at least one isocyanate group and possibly substituents Y which do not react with isocyanates below 100° C. Moreover, the isocyanate group may also be attached to a radical L, meaning —CO— or —SO$_2$—, interposed between the aromatic or heterocyclic ring system and the isocyanate group. Alternatively, polyfunctional aromatic or heterocyclic isocyanates may be used, which are only part, reacted, to preserve at least one isocyanate group, with monohydric or polyhydric alcohols, aliphatic ether alcohols, ethercarboxylic acids, monoamines or polyamines, monocarboxylic acids or polycarboxylic acids, alkylolamines, aminocarboxylic acids, hydroxycarboxylic acids, amides or mono- or polycarboxylic acids, preferably of aliphatic or cycloaliphatic origin, or with ureas, urethanes, guanidines, biguanidines and so forth, before they are reacted with reaction component (A). The last named compounds may possibly contain aliphatic or aromatic substituents. Monomethylol and dimethylol compounds of urea or other precondensates which form aminoplasts, such as dimethyloldimethylurea may also be used for the reaction.

Particularly valuable for certain applications are reaction products which form one or more urethane groups with isocyanates, since the photoconductors thus produced are not only self-adhering but usually also remain readily soluble in solvents, even after the photoconductive layer has dried.

It has also been found that the activity of the photoconductors according to the invention is improved if one aromatic or heterocyclic ring system of reaction component (B) bears at least two groups formed by the reaction of at least one isocyanate group each with the substituent X. Aliphatic isocyantes, such as hexamethylene diisocyanate, are also useful in certain cases.

The following table enumerates examples of reaction component (B).

Phenylisocyanate
o-(m,p)-Nitrophenyl isocyanate
4-dimethylamino-phenyl isocyanate
Tolylene-2,4-diisocyanate
Tolylene-2,6-diisocyanate
N,N'-di(3-methyl-4-isocyanate-phenyl)-uretdione (=-dimerised tolylene-2,4-diisocyanate)
Diphenyl-4,4'-diisocyanate
2-nitro-diphenyl-4,4'-diisocyanate
N,N,N',N'-tetramethyl-benzidine-2,2'-diisocyanate
N,N,N',N'-tetraethyl-benzidine-3,3'-diisocyanate
3-methyl-diphenyl-4,4'-diisocyanate
3,3'-dimethyl-diphenyl-4,4'-diisocyanate
2,2'-dinitro-diphenyl-4,4'-diisocyanate
3,3'-dichloro-diphenyl-4,4'-diisocyanate
Diphenylether-4,4'-diisocyanate 3,3'-dimethoxy-diphenyl-4,4'-diisocyanate
4,4'-diphenylmethane-diisocyanate
Benzophenone-4,4'-diisocyanate
Diphenyl-(dichloromethane)-4,4'-diisocyanate
3,3'-diethyl-diphenyl-4,4'-diisocyanate
Naphthylene-1,5-diisocyanate
1-methyl-naphthylene-2,4-diisocyanate
2-methyl-naphthylene-1,4-diisocyanate
2-methyl-naphthylene-1,5-diisocyanate
Toluylene-2,4-disulphonyl isocyanate
Diphenyl-4,4'-disulphonyl isocyanate
Diphenylmethane-4,4'-disulphonyl isocyanate
Naphthalene-1,6-disulphonyl isocyanate
Fluorene-2,7-disulphonyl isocyanate
Fluorenone-2,7-disulphonyl isocyanate
Dinaphthyloxide-x,x'-disulphonyl isocyanate
Benzoyl isocyanate
p-Dimethylamino-benzoyl isocyanate
Terephthalyl diisocyanate
4,4'-nitro-diphenyl diisocyanate
Hexahydrodiphenyl-4,4'-diisocyanate
Hexamethylene diisocyanate
Adipinyl diisocyanate
Triphenylmethane-4,4',4''-triisocyanate.

Other isocyanates and the uret dione derivatives, the preparation of others and heir further reactions are described in "Methoden der organischen Chemie (Houben-Weyl), 4th edition, volume VIII, Oxygen Compounds III, pp. 119–137 and 220 to 222 (1952), Georg Thieme/Stuttgart, as well as in "Ullmanns Encyclopaedie der technischen Chemie," vol. 9, pages 1 to 14 (1957), Urban & Schwarzenberg/Munich-Berlin.

The novel groupings between the systems of the starting compounds obtained by reaction of the reaction components (A) at their substituents X with isocyanates have a considerable effect upon their activity as photoconductors.

The substituents X may react with isocyanates, once or repeatedly, possibly by yielding $CO_2$ or COS, or only partially, depending upon the number of reactive hydrogen atoms and the nature of the substituent. Groupings formed by reacting the substituent X with isocyanates are for instance the urea, urethane, thiourethane, carboxylamide, sulphonamide, the semicarbazone, the biuret, the carbamide and other groups.

Since the reaction with isocyanates always involves the appearance of the group $$-\underset{H}{N}-$$

the reaction products of component (A) with isocyanates can be reacted with isocyanates again. Relatively simple compounds, such as aliphatic urethanes, particularly of aliphatic polyhydric alcohols, already yield reaction products that are active photoconductors when again reacted with aromatic isocyanates. The following formulae illustrate such reaction products in the form of heterocyclic secondary valence rings which can also be prepared in the azo form.

Component A

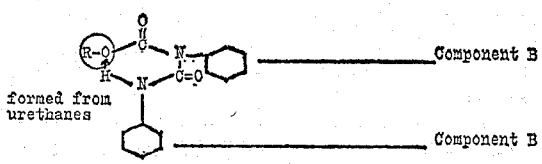

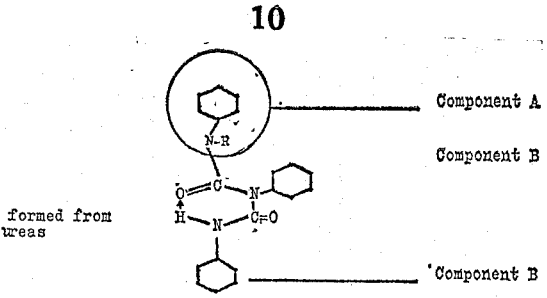

The further reaction is affected for instance by the proportion of reaction component (A) to reaction component (B), the reaction rate with isocyanates of substituents X that are still free, the effect of substituent Y upon X and the effect of any catalysts that may be present.

For the production of self-adhering photoconductors by reacting components A and B various methods may be used that are already known in the art. A selection of such methods is described in "Methoden der organischen Chemie" (Houben-Weyl), vol. VIII, Oxygen Compounds III/Stuttgart 1952/, pp. 129 to 137 and 207, 211.

By using conventional methods reaction components A and B may usually be reacted by either heating them in inert higher boiling solvents or by reacting them in the absence of solvents.

With regard to the proportions of the reactants and the reaction conditions, the amount of the isocyanate reaction component (B) which reacts with the nitrogen-containing reaction component (A) is approximately stoichiometric or molar. This may be modified, however, and there may be fluctuations in the proportion of component (A) depending upon the selection of components employed, to the extent of about 1/10, to protect against an incomplete reaction. This principle is illustrated by Example 8, below, in which 1/10 mol (25.6 g.) of N,N'-diphenyl-p-phenylenediamine is reacted with hexamethylene di-isocyanate, with two NCO-groups and two NH-groups taking part in the reaction.

Advantageously the reaction temperature may range from about 20° C. or room temperature, as illustrated in Example 2, to about 200° C., as illustrated in Examples 7, 9, and 12, below. The reaction time will, of course, depend upon the velocity of the reaction, which in turn depends upon the choice of reactants and temperature. The period of reaction will in general range from about five minutes to about 2½ hours. In any event, the resulting product is film-forming and adhesive, as well as photoconductive.

If several, but different, substituents X are present and it is desired to react these only partly or sequentially, possibly with different isocyanate components, then it is best to proceed in stages, for instance by reacting basic groups or sodium-sulphonamides at reaction temperatures below 100° C., and other acid amides or phenolic hydroxyl groups between 140° C. and 180° C. In special cases, particularly when substituents X are present which have been reduced in reactivity by substituents Y, the reaction mixture is best heated to temperatures above 180° C. Sometimes the use of known catalysts, particularly catalysts that can be readily removed from the product that forms, is very valuable. If carboxyl groups or sulphonic acids participate in the reaction is is advisable to interrupt the reaction for the production of the self-adhering photoconductors either in the first reaction stage which may be regarded as forming mixed diacylamides of the carboxylic or sulphonic acid with the carbamide acid, or to continue the reaction at rising temperature with the evolution of carbon dioxide. If it is desired to react different substituents X at the same time, it has been found particularly expedient so to react the reaction components at temperatures between 160° C. and 220° C. in the melt that the self-adhering photoconductor that forms remains soluble in solvents and no three-dimensional cross linking as yet takes place.

In an alternative procedure mixtures of different reaction components A may be reacted with one reaction component B or with mixtures of such components. Minor portions of unreacted reaction component A in the photoconductor do not reduce its activitiy as a photoconductor.

For special applications it is also useful to control the reaction of the reaction components A and B or of their mixtures in such a way that isocyanate groups remain intact in the self-adhering photoconductor. This permits further reactions to be successfully performed. If free isocyanate groups are present, these will cross link for instance when the temperature is raised and form insoluble, possibly thermoplastic photoconductive layers. Moreover, known substances which have a cross linking effect with isocyanates, such as polyamides, polyalcohols, and the like may be added to the photoconductive layer. Usually a small addition of water or of a polyfunctional reaction component A will be sufficient. By adding a small proportion of water a rubber-like state of the photoconductor can be brought about. By the occlusion of air or gases, for instance by foaming in thin films, photoconductive layers can be obtained which have a considerably reduced margin effect.

Another method of performing the invention for the production of self-adhering photoconductors consists in including in the reaction of the two components A and B further organic compounds which after reaction exhibit no photoconductive properties, but which also contain substituents X or isocyanate groups. Compounds of this kind include primarily aliphatic and particularly long-chained alcohols, fatty acids, aliphatic amines, ester alcohols, polyethylene glycols containing free OH-groups, long-chain aliphatic mono-isocyanates and others. By adding such substances the diversity of the self-adhering photoconductors can be further modified with respect to properties such as solubility, plasticity and hardness, adhesion to bases and photo-electric behaviour. The proposed self-adhering photoconductors can thus be adapted to a wide variety of applications.

Normally the self-adhering photoconductors are produced before their application to a base to form a photoconductive layer. The photoconductors may be insulated and processed in the form of solutions, dispersions or melts to form the photo-conductive layer. Alternatively, the self-adhering photo-conductors may be produced from the reaction components on the base material directly to form a photoconductive layer thereon. To this end a mixture of the reaction components is deposited on the base and the photoconductive layer is formed by raising the temperature, possibly with the simultaneous expulsion of solvents. This procedure is to be recommended more particularly when the reaction components A bear several substituents X or substituents X having several active hydrogen atoms, or if the fresh groupings formed by reaction of the substituent X with the isocyanate group contain particularly active hydrogen atoms. Other substances, for instance for increasing the sensitivity to light may be incorporated in the photoconductive layer. Suitable for this purpose are primarily aromatic or heterocyclic compounds containing strongly polar groups, particularly substances of such a kind that are capable of forming organic molecular complexes, for instance polyalkylamines, esters of dialkylaminocarboxylic acids or dialkylamides, polynitro compounds and others, such as tetraethyl-p-phenylene diamine, x-diethylaminobenzodiethylamide, dinitrophenol ether, 1,1-diphenyl-2-picryl hydrazine, 2-nitro-5-chlorotoluene, trinitrobenzoate and others, cf. Pfeiffer: "Organische Molekülverbindungen," 1922, Stuttgart, published by Ferd.Enke.

Some of the photoconductors according to the invention are generally sensitive to light within the region of 3000 to 4200 A. For many applications it is expedient to add to these photoconductors known and conventional sensitizers, such as are used in silver halide photography, or substances that are customarily used as indicators for hydrogen ion concentration or for oxidation or redox potentials, or dyes which give rise to chelate bonds, in order to make them sensitive to the light of the source employed unless arc or mercury vapour lamps are employed. Normally 0.3 to 3% of the sensitizer may be added to the electro-photographic layer. For instance the following dyes can be used which for identification are given with the numbers under which they appear in Schultz Farbstofftabellen, 7th edition, Leipzig 1931. Triarylmethane dyes, such as Brilliant Green (No. 760), Crystal Violet (No. 785), Methyl Violet (No. 783), Victoria Blue base (No. 822), Night Blue (No. 823), Acid Violet (Nos. 824/831), Cyanin B (No. 829); xanthene dyes, such as Rhodamine B (No. 864), Rhodamine 5 G (No. 862), Rhodamine 3 G (No. 868), Acridine Red B (No. 584), Methylene Red (No. 856), Eosine G (No. 870), Fluorescein (No. 880), Erythrosine Pina (No. 886), Eosine S (No. 883), tetraiodofluorescein, diidofluorescein, Rose Bengale (No. 869); polymethine dyes, such as carbocyamines and others; acridine dyes, such as Acridine Yellow (No. 901), Acridine Orange 2 G (No. 902), Euchrysine (No. 914); quinoline dyes, such as Dicyanine A (No. 928), Quinoline Red (No. 920), Quinoline Blue (No. 921), Ethyl Red (No. 923), Pinaverdol (No. 923), Orthochrome T (No. 923), Pinachrome Violet (No. 923), Pinacyanol Blue (No. 926), Pinachrome Blue (No. 924); thiazine dyes, such as Methylene Blue (No. 1038); quinone and ketone dyes, such as Alizarine (No. 1141), Alizarine Garnet (No. 1144), Quinizarine (No. 1148); azine dyes, such as Safranine T (No. 967), Morine, sulphophthaleines.

Bases for the layers according to the invention may be either electrically conducting or semi-conducting or non-conducting materials, such as metal bodies or films, particularly printing plates, plastics foils, paper, paper webs, fabrics, veneers, or glasses, for instance, plastics sheet material of polycarbonates or cellulose esters etc., coated with metals or rendered conductive by vapour deposition of metals in vacuo or in some other way. However, carrier materials which can be made electrically conductive by irradiation with electromagnetic waves, corpuscular rays or radioactive isotopes are also suitable after they have been thus treated. The photoconductive layer is applied to such a base material. Particularly valuable are layers of a thickness between 0.003 and 0.03 mm.

For producing the photoconductive layer it is expedient to apply the proposed self-adhering photoconductors or their reaction components, for instance in solution, in the form of a dispersion, a solvated gel or in the melt to the base material and any solvent may be driven off or a melt solidified by cooling. Mixtures of different self-adhering photoconductors and/or their reaction components and/or together with supplementary substances for generating the photoconductive layer may be used. For improving abrasion resistance, particularly when the proposed self-adhering photoconductors still contain free isocyanate groups that are suitable for three-dimensional cross-linking, or when the photoconductive layer is produced directly from the reaction components, it is advisable subsequently to heat the applied layer to between 120 and 180° C.

If absorbent base materials are used for the production of the electro-photographic material, it may be preferable first to coat these base materials for instance with water-soluble or swellable colloids to prevent the photoconductive layer from being absorbed into the base material and from thus forming an irregular surface.

If the photoconductive layer is applied to a transparent base, when the electro-photographic material thus obtained can be used, after the image has been formed, as an intermediate copy for making further prints on any desired photosensitive material.

By the employment of suitable film-forming reaction products the photoconductive layer can be made sufficiently thick to be self-supporting.

Furthermore, photoconductors of other kinds may be added to the proposed electrophotographically effective film-forming and adhering reaction products, such as organic photoconductors that are soluble or dispersible in the self-adhering photoconductor, photoconductive pigments, photoconductive metal compounds, such as zinc oxide, lead chloride, zinc sulphide, or organic metal complex compounds, as well as non-photoconductive pigments, including for instance titanium dioxide or blanc fixe.

The electro-photographic properties of layers which, as a photoconductor, contain only zinc oxide dispersed in a conventional binder are ascribed to the surface being charged with negative oxygen ions which form only in a negative corona discharge. Contrary thereto it has been found that by combining a self-adhering photoconductor according to the invention with zinc oxide in specific proportions photoconductive layers can be produced which can be charged both under a negative and a positive corona discharge. With reference to the mechanism which leads to the generation of an image the two types of layer preparation are therefore essentially different.

The colour and half tones of an original are reproduced by electro-photographically effective surfaces prepared with the proposed combination in a manner exhibiting smooth coherent surfaces and soft colour transitions substantially free from graining, and very clearly differing from prints obtained with the aid of zinc oxide in mixture with insulating binders. This excellent reproduction is apparently due to the fact that in the combination of pigment-like photoconductors, such as zinc oxide, with the proposed reaction products all the constituents that make up the surface are photoconductors and that they all share in the construction of the image. This image therefore appears as the result of the specific superimposition of two different electro-photographic functional mechanisms which are complementary insofar as they both attract the toner particles for forming the image.

Particularly valuable for combination with pigment-like photoconductors principally with zinc oxide, apart from those obtainable by reacting component A with isocyanates, where Z bears an aromatic system and X a mono- or di-($\beta$-hydroxy)alkylamino group or an ethyl-($\beta$-hydroxy)alkylamino compound, are self-adhering photoconductors which have been prepared by reacting with isocyanates organic compounds containing sulphonamide groups, possibly with the interaction by condensation of aldehydes.

Suitable sulphonamide components are aryl-sulphonamides, aralkyl-sulphonamides or heterocyclic sulphonamides containing further substituents, particularly —OH, —NH$_2$, —NH-acyl, —CN, —NR''$_2$, —NR-acyl, —NO$_2$, =N—OH groups, where R'' is a lower molecular weight aliphatic radical, phenyl or a heterocyclic ring system and acyl is a monocarboxylic acid, particularly of the fatty acid series. Moreover, the nitrogen atom of the sulphonamide group may be substituted with a lower molecular weight aliphatic radical, whereas the second H-atom may be reacted with an aldehyde to form an alkylol group. Thus, after reaction with isocyanates, conventional sulphonamide resins are suitable both in liquid and solid form for the production of self-adhering photoconductors which in combination with ZnO are capable of accepting a positive charge. The production and properties of a selection of suitable starting compounds is described in "Kunststoffe" 39th year, pp. 109–113 (1949), Carl Hanser Verlag, Munich.

One way of performing the electrophotographic process consists in transferring the electrostatically adhering toner image from the electrophotographic material, preferably in an electric field and/or by contact pressure to other sheet-like materials, particularly paper, cardboard, plastics foil, wood or metal surfaces provided with an insulating varnish coating. Electrophotographic materials produced with the aid of the proposed self-adhering photoconductors are suitable for the repeated production of prints. Moreover, by selecting suitable toner systems and by applying a suitable charge, positive reproduction of for instance negative microfilm originals can be directly produced on the electrophotographic material.

The photoconductors according to the invention are particularly suitable for the production of electro-photographic materials because they can be used for the preparation of active layers without needing the addition of binders or other aids. The production of a preparative mixture with the aid of the proposed photoconductors is possible because sufficient solvents are available for the proposed single-phase product.

During the concentration of its solution and during processing a non-uniform distribution of separate photoconductor particles in an uncombined preparation need not be feared. Moreover, most of the described compounds can be prepared from products that are commercially available and relatively cheap. These advantages greatly facilitate manufacture which can proceed more smoothly with the production of uniform products.

After their application the novel photoconductive compounds represent high quality, usually hard and flexible, abrasion-resistant films, and they excel by their outstanding adhesion to a great diversity of bases, particularly metals, as well as paper, since besides their photoconductivity they also possess those properties of isocyanate polyadducts which are so valued in lacqueurs, adhesives and elastomers. Many can be processed to provide an insoluble electro-photographically active layer. They are present in molecular distribution and therefore assure the maximum possible homogeneity in the electro-photographic effect. A grain texture is not detectable in layers prepared with their aid, even in combination with pigment-like photoconductors. The preferably single phase layer preparation containing the described reaction products also prevents segregation and impoverishment in active substance by precipitation phenomena, such as crystallisation or agglomeration of the photoconductor constituents. The electro-photographically effective groups in the film-forming molecularly dispersed products may differ according to the selected structure, though spatially arranged in the molecular lattice in a well-defined way, and they may thus exhibit different spectral sensitivities. Consequently the products are homogeneous and uniformly effective even if their photoconductivity, for instance with respect to the absorption of light, must be made to comply with specific requirements. By the inclusion of selected reactive components in the molecule of the described compounds other functions are likewise controllably variable in a most desirable manner.

For instance, groups which function as electron donors, and such as function as electron acceptors may be included in the same molecule in a spatially favourable disposition. The physical properties of the products are therefore capable of variation within a very wide field and they are thus flexibly adaptable to the requirements of different applications.

The advantage of a combination of the described novel electro-photographically effective compounds with known pigment-like photoconductors, such as zinc oxide, primarily resides in the ability of a correspondingly prepared layer to reproduce images of good contrast, which appear to be substantially free from grain and smoothly coherent. Colour and half tones of an original are reproduced outstandingly well. Furthermore, layer combinations consisting of self-adhering photoconductors and zinc oxide are capable of being both negatively and positively charged, a great advantage from the applicational point of view.

Charging, exposure, development, and possibly transfer, fixation and so forth are performed in conventional manner with the employment of the customary aids.

The following examples may serve to illustrate the invention.

Example 1

The isocyanate component used was a modified triisocyanate containing three free isocyanate groups in the molecule and obtained by reacting 1 mole of trimethylol propane with 3 moles of 2,4- or 2,6-toluylene diisocyanate, that isocyanate group being reacted which is in paraposition to the methyl group. The product was dissolved in ethyl acetate to form a 75% by weight solution.

18.2 g. N-diethyl-N'-acetyl-p-phenylenediamine,
29.2 g. of the isocyanate solution and
30 ml. of cyclohexanone were boiled under reflux for 30 minutes.

2 parts by volume of the resultant solution were diluted with 1 part by volume of dioxane and 1 part by volume of acetone. The mixture was used for coating an aluminium plate that had been anodically lustred. The layer was dried at 140 C. for 3 minutes. The hard photoconductive film adhered well to the aluminium base. The electro-photographic material was highly sensitive to light into the long wave ultraviolet spectral region. By adding 1% of Safranine T or 0.5% of Eosine (blue tint) to the sensitizing solution high sensitivity to the light of an incandescent electric lamp was imparted to the material.

After having been negatively charged, exposed to an original for 4 seconds with a 150 watt incandescent lamp and developed with a commercially available triboelectric toner of resin and carbon black ("Graph-O-Fax 39/50," made by Philip A. Hunt Co., Palisades Park, N.J., U.S.A.) and glass spheres a highly contrasted positive print of an original was obtained.

The photoconductive layer could also be washed out with a mixture of 80 parts by volume of ethanol, 10 parts by volume of methyl glycol and 10 parts by volume of concentrated phosphoric acid for use as a lithographic plate, particularly for offset work.

Example 2

20.5 g. of anthranilic acid
87.5 g. of the isocyanate solution described in Example 1 where dissolved cold in 500 ml. of cyclohexanone,
250 ml. of dioxane and
250 ml. of acetone.

At room temperature the solution was applied in a centrifuge to an anodically lustred aluminium sheet and then reacted for 5 minutes with the simultaneous removal of the solvents at 160 to 180° C. A firmly adhering, hard, shiny, homogeneous, substantially colourless photoconductive film which was insoluble in solvents and exhibited a good sensitivity to light in the spectral region of a high pressure mercury vapour lamp was thus formed.

Example 3

47.5 g. of m-dimethylaminophenol and
87.5 g. of the isocyanate solution described in Example 1 were dissolved in 150 ml. of methylcyclohexanone and reacted at 150 to 155° C. under reflux for 2.5 hours.

For producing a photoconductive layer of the desired thickness an appropriate proportion of lower molecular weight ketones was added to the reaction solution for achieving a layer thickness of about 0.006 mm. when using the apparatus employed for aplication. This self-adhering photoconductor is highly photo-sensitive in the spectral region of high pressure mercury vapour lamps or ultraviolet fluorescent lamps. Short exposures were also obtained with high pressure xenon lamps, such as those used for electronic flash.

For the production of printing plates, particularly for offset printing, an anodised thin aluminium sheet was used. An even coating of a 3 percent by weight aqueous solution of gelatine was applied to the anodise surface and dried. The above described diluted solution to which 0.5% of Rose Bengale and 0.2% of Quinoline Blue had been added was then applied and dried at 130° C. The electro-photographic plate was highly photo-sensitive in the spectral region of incandescent lamps and, after having been charged, exposed to an original, developed, fixed and washed out, provided a printing plate which was capable of yielding a large number of highly contrasted prints.

Example 4

20.4 g. of acetanilide were dissolved hot in 100 ml. of cyclohexanone

To this solution were added 43.8 g. of the isocyanate solution described in Example 1 and reacted at about 150° C. for 7 to 10 minutes.

The self-adhering photoconductor must still be soluble in cyclohexanone and capable of being diluted with dioxane.

The reaction mixture was diluted with a like proportion of ethylacetate. The resultant solution was used for coating an anodically lustred aluminium sheet. The film was then dried at 160° C. until the solvent had been completely driven off.

After having been negatively charged, exposed to a negative original and developed as in Example 1, a positive image was obtained. This photoconductive layer was therefore suitable for reversal printing.

Example 5

The isocyanate used was a modified isocyanate available in the trade ("Desmodur L" made by Farbenfabriken Bayer, Leverkusen, Germany), obtained by reacting an isomer mixture of 2,4- and 2,6-toluylene diisocyanate with a polyalcohol mixture and containing urethane groups in addition to the isocyanate groups. The product was used in the form of a 75% by weight solution in ethyl acetate.

31 g. of 2-methyl-4-nitro-5-chloro-aniline and
43.7 g. of the isocyanate solution were dissolved in 110 g. of cyclohexanone and reacted for 10 minutes at 133–144° C.

As the reaction proceeded the reaction product became highly viscous. If the temperature had been exceeded the reaction product would have become insoluble.

The reaction solution was diluted with a like volume of cyclohexanone and then applied to a copper foil to form the photoconductive layer which was dried at 160° C.

The photoconductive layer adhered firmly to the metal foil, it was very abrasion-resistant and insoluble in solvents.

After having been negatively charged, exposed to a positive original with the aid of a high pressure mercury vapour lamp and developed with a triboelectric developer consisting of carbon black, resin powder and glass spheres, a positive image of the original was obtained.

Example 6

31.4 g. of p-bromo-acetanilide and
39.6 g. of the isocyanate solution described in Example 5 were dissolved in 100 ml. of cyclohexanone and reacted for 2 hours under reflux. With stirring, 95 ml. of cyclohexanone were then distilled off, the temperature rising to 200° C. As soon as the strongly exothermic reaction began the reaction mixture was strongly cooled. Finally the resin which solidified in vitreous form when cold was dissolved in 400 ml. of cyclohexanone.

For the production of the photoconductive layer an aluminum sheet was coated with the heated resin solution and then dried at 160° C.

The electro-photographic material was sensitive in the spectral region of a high pressure mercury vapour lamp. If 2.5% of Rhodamine B or 2% of Rose Bengale or 2% of tetraiodo-eosine are added the electrophotographic material is sensitized to the light of an incandescent lamp. The further procedure was as described in Example 5, a positive image of the original being obtained.

Example 7

19.6 g. of N,N'-dibenzoyl benzidine and
10.5 g. of naphthylene-1,5-diisocyanate were finely pulverised and thoroughly mixed. The mixture was melted down in an oil bath and then kept for 5 minutes at 200° C. The melt was cooled and dissolved in 50 ml. of cyclohexanone and
100 ml. of methyl ethyl ketone.

The mixture was used for forming an approximately 0.007 mm. film on a brass sheet. The film was dried at 140° C.

The further procedure was as described in Example 5, a high contrast image of the original being obtained.

Example 8

25.6 g. of N,N'-diphenyl-p-phenylene diamine (symm.) and
17 g. of hexamethylene diisocyanate were heated for 35 minutes under reflux until the viscosity of the solution had considerably increased and only minor portions of hexamethylene diisocyanate continued to boil.

50 ml. of cyclohexanone were then added. Refluxing was continued for another 10 minutes.

(a) 10 ml. of the reaction solution was diluted with 20 ml. of methyl ethyl ketone.

A film of the diluted solution was applied to an anodically lustred aluminium sheet in a centrifuge. The film was dried at 160° C.

(b) 1 g. of 3,5-dinitrobenzoyl chloride was added to 10 ml. of the reaction solution.

The mixture was heated for 5 minutes at 150° C. and after having cooled, diluted with 20 ml. of methyl ethyl ketone.

This solution was also used for coating an anodically lustred aluminium sheet as above.

Both samples were charged under a 10 kv. corona discharge.

Sample (a) gave a high contrast image without a background after having been exposed for 1 second by UV fluorescent lamps to a positive original and developed as in Example 1.

Sample (b) produced the same image after an exposure of ¼ second.

An addition of 3.5-dinitrobenzoyl chloride before the photoconductive layer was baked considerably raised the sensitivity to light of the electro-photographic material.

Example 9

21 g. of ethyl-α-naphthyl amine and
26.6 g. of the solvent-free isocyanate component described in Example 1 were molten down, heated to 200° C. in the course of 10 minutes and kept at this temperature for two minutes. The melt was then cooled and 12 g. of 3,5-dinitro-benzoyl chloride were added. The temperature was again raised to 200° C. The melt effervesced with a lively evolution of hydrogen chloride. When the further evolution of HCl ceased the melt was cooled, dissolved in 100 ml. of cyclohexanone and finally diluted with twice the proportion by volume of a mixture of 50% acetone and 50% methyl ethyl ketone.

In a centrifuge the diluted reaction product was applied to an anodically lustred aluminium sheet and dried at 150° C. The effect of the 3,5-dinitrobenzoyl chloride on the reaction product was to increase its sensitivity to light considerably by comparison with a reaction product of ethyl-α-naphthyl amine and the above isocyanate component.

The use of mononitrobenzoyl chlorides and dinitrobenzoyl chlorides in the production of photoconductors from other aromatic mono- or di-monoalkylamino compounds and isocyanate components likewise raises the sensitivity to light of the photoconductor.

Example 10

For the production of a modified diisocyanate 21 g. of naphthylene-1,5-diisocyanate were dissolved in 200 g. of warm chlorobenzene,
8.6 g. of 2-ethyl-2-butyl-propanediol-1,3 were then added and the mixture was reacted first for 20 minutes at 100° C. and then for 10 minutes at 120° C.

For further reaction 16.5 g. of ethyl-(β-hydroxyethyl)-aniline were introduced into this modified diisocyanate and the mixture was reacted by refluxing the same for one hour. By raising the temperature the chlorobenzene was driven off at normal pressure and the remaining viscous resin was dissolved in 45 g. of cyclohexanone and filtered.

For the production of a photoconductive film 1 part by volume of the solution of the photoconductive resin was diluted with 2 parts by volume of acetone and 1 part by volume of dioxane. The solution was sensitized with 0.2% of Quinoline Blue and 0.3% of Rhodamine B.

The electrophotographic film was highly sensitive both in the range of the pure and of the transformed mercury spectrum and in that of an incandescent electric lamp. It could be charged both under a positive and a negative corona discharge and after exposure and the employment of appropriate direct or reversal toners positive as well as negative prints could be obtained for instance in one operation.

Example 11

For the production of a modified isocyanate component 34.9 g. of a mixture of 80% toluylene-2,4-diisocyanate and 20% of toluylene-2,6-diisocyanate were dissolved in 150 ml. of cyclohexanone.

To this solution there were added 17.2 g. of 2-ethyl-2-butyl-propanediol-1,3 and the mixture was reacted first at 100° C. for 15 minutes and then at 120° C. for 10 minutes. The reaction product which will be hereunder referred to as product A, contained about 2 free isocyanate groups in the molecule. To this product A there were then added 33 g. of ethyl-($\beta$-hydroxyethyl)-aniline and the mixture was reacted by boiling it under reflux at 150 to 155° C. for 45 minutes. The product of this reaction will be hereunder referred to as product B.

For the production of a photoconductive layer product A was diluted with 2 parts of acetone. The solution was applied in the form of a film to an anodically lustred aluminium sheet. The film was baked for 10 minutes at 160° C. If the photoconductive film is dried in a vacuum at 60° C. its electrophotographic activity is slight. However, if baking is carried out at 160° C., so that free isocyanate groups can continue to react, then the photoconductive film formed by product A already exhibits a perceptible sensitivity to light suitable for electro-photographic reproduction.

After this had been further reacted with ethyl-($\beta$-hydroxyethyl)-aniline to form product B the sensitivity to light increased considerably. If 0.5% Rose Bengale and 0.2% of Pinacyanol Blue were added to product B after this had been diluted in the same way as A, then the photoconductor exhibited a high sensitivity to the light of an incandescent lamp.

Example 12

58 g. of m-diethylaminobenzoic acid were dissolved with the application of heat in 87.5 g. of the isocyanate solution according to Example 1. The ethyl acetate was distilled off at 120 C. In the course of 5 minutes the melt was heated to a temperature of 200° C. There was a lively evolution of gas. The temperature was kept at 200° C. (about 15 minutes) until the evolution of $CO_2$ faded. After having cooled to 140° C. the reaction product was disolved in 200 ml. of cyclohexanone
10 ml. of this solution were diluted with
10 ml. of acetone and
5 ml. of methyl ethyl ketone.

The diluted solution was mechanically applied in the form of a film to an electrolytically lustred and anodised aluminium sheet. The film was dried at 140° C. It was highly sensitive to ultraviolet light and also had a useful sensitivity to the light of an incandescent lamp.

For improving the light sensitivity 0.2% of Rose Bengale, 0.1% of Cyanine Blue or, instead of Rose Bengale, 0.2% of tetraiodoeosine (free acid) can be added to the above described preparation.

Example 13

55 g. of a reaction product of a surplus p-toluene-sulphomethylamide and formaldehyde (such as the product sold under the name "Kunstharz TS" by Messrs. Anorgana, Gendorf, Upper Bavaria, Germany)

were molten down in a vacuum at 100° C. At normal pressure there were than added 87.5 g. of the isocyanate solution described in Example 1. In the course of 10 minutes the temperature was raised to 135° C., causing a minor quantity of formaldehyde to split off and the ethyl acetate to be expelled. In the temperature region between 135 and 150° C. there was a lively evolution of gas. As soon as the temperature reached 150° C.

100 ml. of cyclohexane were added and the mixture was heated at 120° C. for another 12 minutes for the purpose of completing dissolution and continuing the reaction, 10 parts of the reaction solution being diluted with 20 parts by volume of acetone and 20 parts by volume of methyl ethyl ketone. The diluted solution was mechanically applied to an anodically lustred aluminium sheet and the film dried at 130° C. in a current of hot air.

The photoconductive film adhered firmly to the aluminum base and its hardness and abrasion resistance were good. After having been charged under a 10 kv. negative corona discharge and exposed to a positive original by the light of a high pressure mercury vapour lamp, a positive image of the original was obtained by developing with a pigmented resin powder and glass spheres.

Example 13b 50 g. of the above described photoconductor dissolved in cyclohexanone were diluted with 75 g. of methyl ethyl ketone and
75 g. of zinc oxide, Florence Green No. 8.

The mixture was milled for one hour in a ball mill. The resultant slurry was heated for two hours under reflux or as an alternative it was allowed to sand for 5 to 10 days. The dipsersion was then intensely milled in the ball mill and applied mechanically to an 80 g. cellulose paper without an undercoat. The layer was dried at 120° C. in a current of hot air. For improving the sensitivity to incandescent lamp light, 0.1% of Rose Bengale and 0.05% of Pinacyanol Blue may be added to the photoconductive layer.

The electro-photographic material which contained two photoconductors, namely the self-adhering photoconductor according to the invention and the zinc oxide, was highly sensitive to ultraviolet light and the spectral range of the incandescent lamp. Its sensitivity was perceptibly higher than that of electro-photographic papers containing zinc oxide in binders that are electro-photographically inactive. Contrary to these known papers the proposed electro-photographic paper can be negatively charged as is conventional and it can also be charged under a positive corona for the formation of an image.

While only a few embodiments of the present invention have been shown and described, it will be understood that many changes and modifications may be made therein without departing from the spirit and scope of the invention, as defined by the appended claims.

What is claimed is:

1. A self-adhering photoconductive layer for deposit on an electrically conductive substrate, said layer consisting essentially of the reaction product of (A) at least one substantially non-photoconductive aniline, acetoacetanilide, phenylene diamine, diphenylamine, benzidine, amino-substituted phenol or diphenyl, aminobenzoic acid, benzalmalononitrile, or arylsulphonamide compound, said compound incorporating a moiety capable of reacting with an isocyanate group and selected from the group consisting of —OH, —SH, —NH₂, —NHR, —NH-acyl, —COOH, —CONH₂,

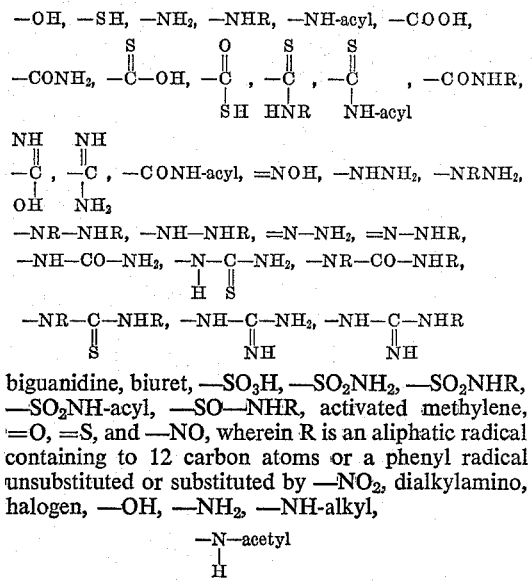

biguanidine, biuret, —SO₃H, —SO₂NH₂, —SO₂NHR, —SO₂NH-acyl, —SO—NHR, activated methylene, =O, =S, and —NO, wherein R is an aliphatic radical containing to 12 carbon atoms or a phenyl radical unsubstituted or substituted by —NO₂, dialkylamino, halogen, —OH, —NH₂, —NH-alkyl, —N—acetyl
|
H —COOH, COONH₂, or —SH, and (B) at least one organic compound containing an isocyanate group, selected from the group consisting of aromatic and heterocyclic mon- and polyisocyanate compound and uret-dione dimerized isocyanates, said reaction product having film-forming and adhesive properties and being photoconductive, and being obtained by the reaction of approximately molar proportions of the reactants in a temperature range from about 20° C. to about 200° C. for a period between five minutes and two and one-half hours and .3–3% sensitizer for increasing the sensitivity of the photoconductive layer to light.

2. The photoconductive layer of claim 1 in which there is dispersed an additional photoconductive metal compound.

3. The composition of claim 2 in which said additional photoconductive compound is photoconductive zinc oxide.

4. The composition of claim 1 in which the sensitizer is selected from the group consisting of a mononitrotrichlorobenze and a polynitrochlorobenzene.

5. The composition of claim 1 in which an additional photoconductive metal compound is admixed with the reaction product forming the upper layer.

References Cited
UNITED STATES PATENTS

| | | | |
|---|---|---|---|
| 3,408,185 | 10/1968 | Mammino | 96—1.5 |
| 3,265,497 | 8/1966 | Kosche | 96—1.5 X |
| 3,331,687 | 7/1967 | Kosche | 96—1.5 |
| 3,300,304 | 1/1967 | Kosche | 96—1.5 |
| 3,567,440 | 3/1971 | Kosche | 96—1.5 X |

NORMAN G. TORCHIN, Primary Examiner

J. R. MILLER, Assistant Examiner

U.S. Cl. X.R.

96—1.5, 1.6, 1.7